United States Patent
Palasz et al.

[11] Patent Number: 5,875,641
[45] Date of Patent: Mar. 2, 1999

[54] CONTACTOR WITH SOLID STATE PROTECTION CIRCUIT FOR A VAPOR COMPRESSION AIR CONDITIONER

[75] Inventors: Mark A. Palasz, St. Charles; Gregg Jonsson, Batavia, both of Ill.

[73] Assignee: Siemens Energy & Automation, Inc., Alpharetta, Ga.

[21] Appl. No.: 938,767

[22] Filed: Sep. 26, 1997

[51] Int. Cl.⁶ .................................................. F25B 49/02
[52] U.S. Cl. .............................. 62/228.1; 62/126; 361/22
[58] Field of Search ................................ 62/228.1, 228.3, 62/126, 127, 129, 130, 161; 361/22, 23, 24, 25, 28, 30, 31, 33, 115

[56] References Cited

U.S. PATENT DOCUMENTS

| | | |
|---|---|---|
| Re. 28,716 | 2/1976 | Montz . |
| 3,149,224 | 9/1964 | Horne et al. . |
| 3,210,605 | 10/1965 | Jones . |
| 3,646,560 | 2/1972 | Barlow, Jr. . |
| 3,678,354 | 7/1972 | Kitanosono et al. . |
| 3,792,289 | 2/1974 | Kazem . |
| 4,268,884 | 5/1981 | Ford, Jr. et al. ............................ 361/22 |
| 4,642,481 | 2/1987 | Bielinski et al. . |
| 4,758,918 | 7/1988 | Shapess ..................................... 361/22 |
| 4,782,419 | 11/1988 | Belbel et al. . |
| 5,062,278 | 11/1991 | Sugiyama ............................. 62/126 X |
| 5,463,874 | 11/1995 | Farr ..................................... 62/129 X |
| 5,528,444 | 6/1996 | Cooke et al. . |

*Primary Examiner*—Harry B. Tanner

[57] ABSTRACT

Problems in shutting down the compressor in a vapor compression air conditioner in response to high pressure, low pressure and frozen refrigerant conditions are eliminated in a protection circuit that includes a contactor coil to control the power supply to the compressor. The use of a semiconductor switching configuration in the protection circuit provides for disconnecting the power to the compressor under fault conditions and for ensuring that the power connection to the compressor remains disabled until the conditions which initially triggered the protection circuit are corrected.

16 Claims, 2 Drawing Sheets

CONTACTOR WITH SOLID STATE PROTECTION CIRCUIT FOR A VAPOR COMPRESSION AIR CONDITIONER

FIELD OF THE INVENTION

This invention relates to vapor compression air conditioners, and more particularly, to a solid state protection circuit for the compressor in the air conditioner.

BACKGROUND OF THE INVENTION

A schematic diagram of a prior art protection circuit for a vapor compression air conditioning system 10 is illustrated in FIG. 1. When a vapor compression air conditioner 10 experiences fault conditions, including high pressure, low pressure or frozen refrigerant, it is necessary to shut down the compressor 12 to prevent damage to the compressor 12 and/or other components of the air conditioner.

In order to turn off the compressor 12 in response to these fault conditions, industry has typically employed a lockout mechanism known as a "Lockout Relay" or an impedance relay 14. The lockout circuitry generally includes a relatively low impedance contactor coil 16 that is used to open and close the main normally open contacts 18 of the air conditioner compressor power circuit. A small control circuit transformer is typically used to supply the control voltage 20 to power the lockout circuitry. In one current path, normally closed lockout relay contacts 22 and conventional sensing switches 24, 26 and 28 designed to respond to high pressure, low pressure and frozen refrigerant conditions respectively within the air conditioner 10, are placed in series with the compressor contactor coil 16. In an alternate path, the compressor contactor coil 16 is placed in series with a relatively high impedance lockout relay coil 30. The lockout relay coil 30 opens the lockout relay contacts 22 under the predefined fault conditions. The lockout relay contacts 22 and sensor switches 24, 26 and 28 are positioned parallel to the lockout relay coil 30.

Under normal operating conditions, the current flows through the compressor contactor coil 16, the closed relay contacts 22 and the closed sensor switches 24, 26 and 28. Sufficient current flows through the compressor contactor coil 16 to maintain the compressor contacts 18 in a closed state and the compressor 12 remains on. In the alternate path, since the lockout relay coil 30 has a relatively high impedance, only minimal current flows through the lockout relay coil 30 and the lockout relay contacts 22 remain closed.

In the event that one of the sensing switches 24, 26 or 28 opens in response to one of the predefined fault conditions within the air conditioner 10, current can only flow through the lockout relay coil 30 and the compressor contactor coil 16. As the impedance of the contactor coil 16 is relatively low, the lockout relay coil 30 now receives sufficient power to open the normally closed lockout relay contacts 22. At the same time, because of the relatively high impedance of the lockout relay coil 30, the compressor contactor coil 16 no longer receives sufficient power to maintain the compressor contacts 18 in a closed state resulting in the compressor 12 being shut down. Even if the open sensing switch 24, 26 or 28 subsequently closes, the lockout relay contacts 22 remain open so that the current continues to flow through the high impedance lockout relay coil 30. The lockout relay coil 30 continues to hold the lockout relay contacts 22 open until the system is reset manually by the opening and then closing of a power supply switch 32.

There are a number of factors that may affect the reliability of the lockout relay circuit. The impedances of the compressor contactor coil 16 and the lockout relay coil 30 must be carefully matched to ensure that when a switch 24, 26 or 28 senses a predefined fault condition, the lockout relay coil 30 has sufficient power to open the lockout relay contacts 22, and at the same time, the compressor contactor coil 16 is deprived of sufficient power to close the compressor contacts 18. Significant impedance variations due to tolerances on the lockout relay coil 30 and the compressor contactor coil 16 components make impedance balancing difficult. Also, since contactors are conventionally used as on/off devices with either a rated voltage or zero voltage across the associated coil, manufacturers do not generally publish sufficient coil operating information, making special inquiries or additional testing of the coils necessary to ascertain the voltage drop values that will assure system operation.

In addition, if the control voltage 20 is not maintained within a narrow operating range, the lockout circuitry may also malfunction. Small circuit control transformers with high secondary voltages often have poor regulation. If the control voltage 20 is too high, there will be sufficient current available to pull in both the lockout relay coil 30 and the compressor contactor coil 16. This will cause the lockout relay coil 30 to open the relay lockout contacts 22, but it will also enable the compressor contactor coil 16 to close the contacts 18 so that the compressor 12 remains on. If the control voltage 20 is too low, there will be insufficient current for the lockout relay coil 30 to maintain the contacts 22 in an open position and the lockout circuit will have the possibility of resetting itself, even if the fault conditions within the air conditioner 10 have not been corrected.

Clearly, it would be desirable to use a lockout mechanism that would eliminate the need for coil impedance balancing, that would not be as susceptible to control voltage fluctuations, and that would ensure that the power to the compressor would remained "locked out" until the fault conditions which initially triggered the lockout circuit had been corrected and the system reset manually. It would also be desirable to use a contactor with a built in lockout mechanism in order to reduce the number of components mounted and the amount of interwiring between components. The present invention seeks to achieve these objectives.

SUMMARY OF THE INVENTION

It is the principal object of the invention to provide a new and improved protection circuit for a compressor in a vapor compression air conditioner that can be easily integrated into a motor contactor component. More specifically, it is an object of the invention to provide such a protection circuit that eliminates the need for coil impedance balancing, is not as susceptible to control voltage fluctuations, and ensures that the power to the compressor remains "locked out" until the fault conditions which initially triggered the lockout circuit have been corrected and the system reset manually.

An exemplary embodiment of the invention achieves the foregoing object in a protection circuit for a vapor compression air conditioner that is energized from a power supply by the closing of contacts operated by a contactor coil. The protection circuit includes a contactor coil and at least one sensing switch placed in series with the contactor coil and power supply. The sensing switches respond by changing state to predetermined fault conditions within the air conditioner. These fault conditions include but are not limited to high pressure, low pressure and frozen refrigerant conditions. A diode bridge is connected between the sensing switches and the coil.

A first switch is connected across the diode bridge. When this switch is in a first state, it allows sufficient current to flow through the compressor contactor coil to close the associated contacts. In a second state the aforementioned switch prevents sufficient current from flowing through the compressor contactor coil to close the contacts, allowing the contacts to open. A second switch is placed in a control relation to the first switch. This second switch is designed to hold the first switch in its second state when the sensing switch changes state in response to a predetermined fault condition within the air conditioner. In a preferred embodiment, the first and second switches are solid state devices.

Other objects and advantages will become apparent from the following specification taken in connection with the accompanying drawings.

DESCRIPTION OF THE PREFERRED EMBODIMENTS

Figure 1:
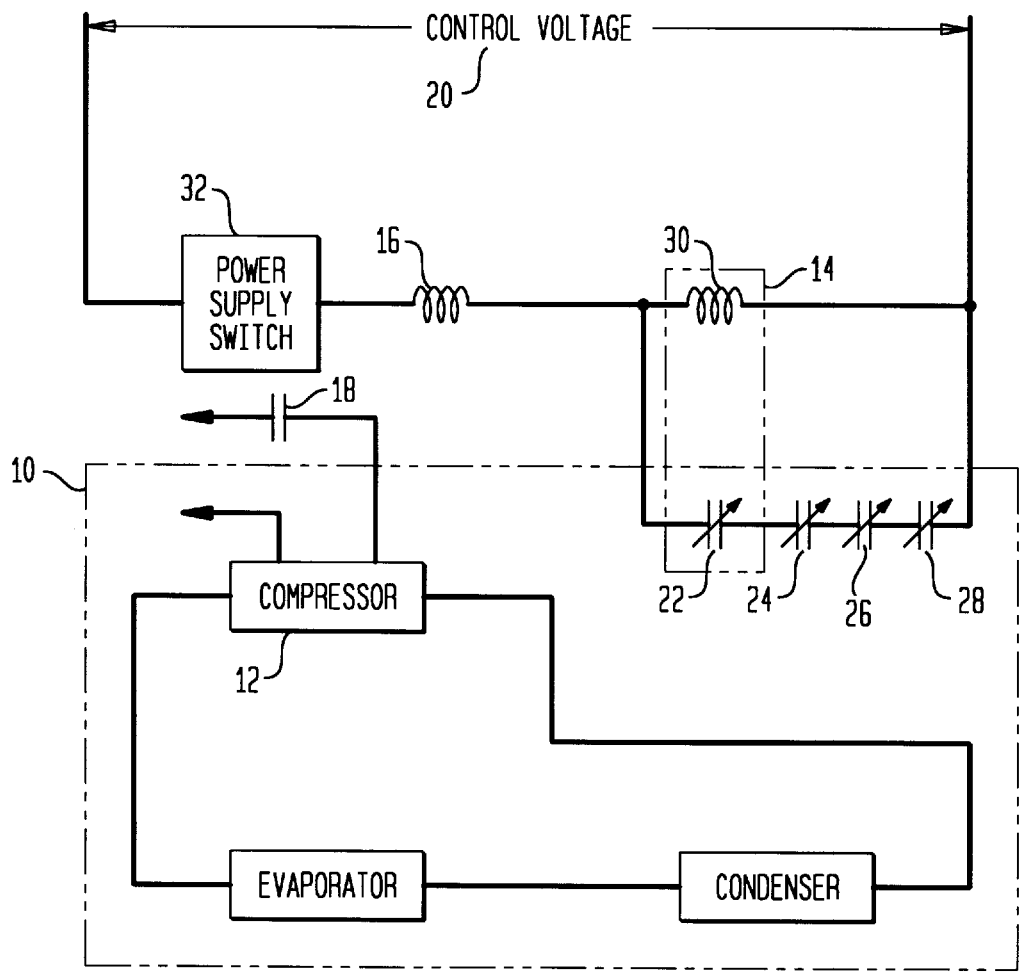
FIG. 1 is a schematic of a prior art protection circuit.
Figure 2:
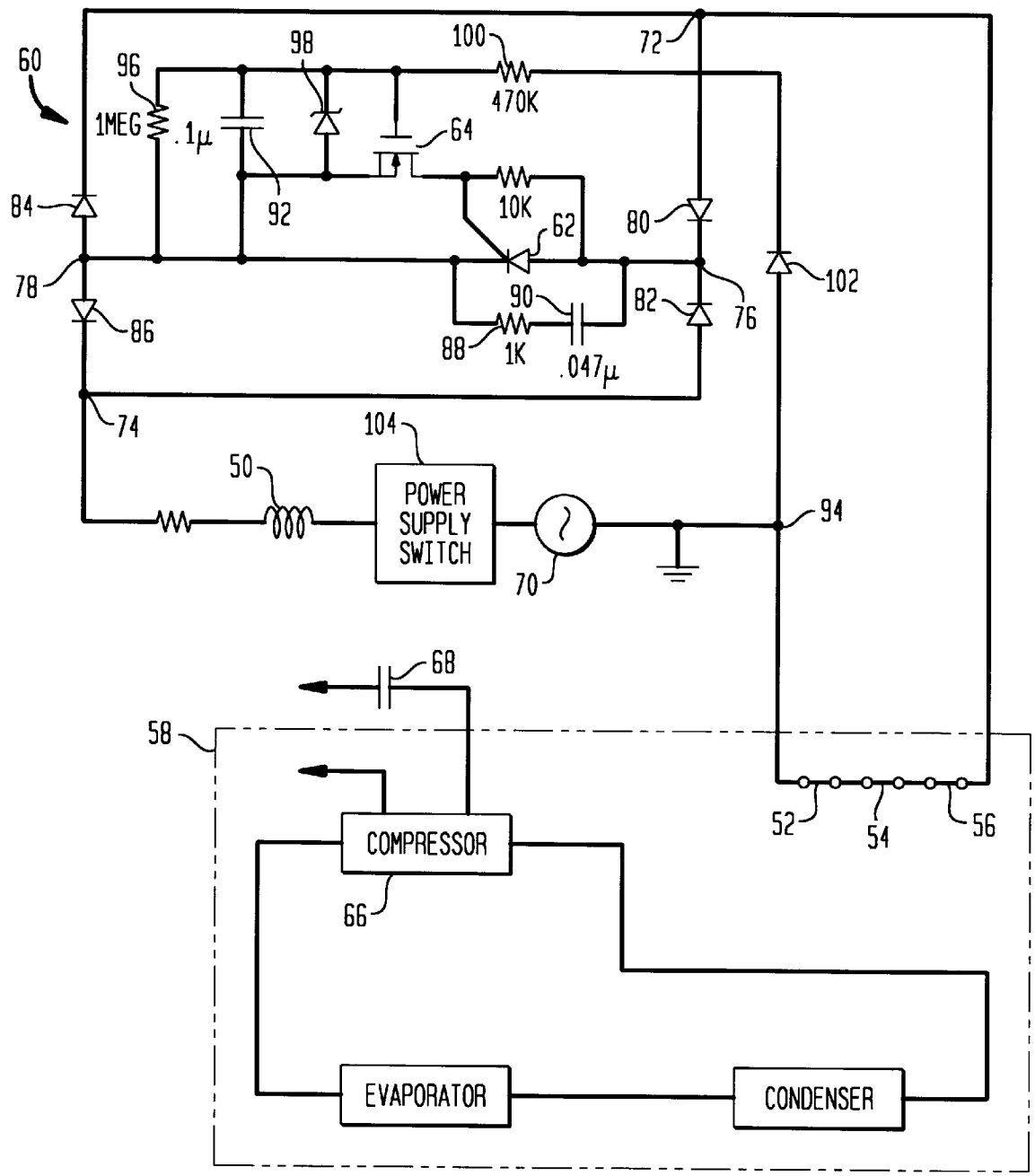
FIG. 2 is schematic circuit diagram of the preferred embodiment of a solid state protection circuit made according to the invention in its intended environment.

An exemplary embodiment of the solid state protection circuit according to the invention is shown in FIG. 2. This circuit includes a compressor contactor coil 50, one or more sensing switches 52, 54, 56 designed to open in response to high pressure, low pressure or frozen refrigerant conditions respectively within a vapor compression air conditioner 58, a full-wave rectifier bridge 60, a first switching solid state device 62, and a second solid state device 64 in control relation to the first device 62.

The air conditioner 58 includes a conventional compressor 66 that may be connected to power by normally open contacts 68 operated by the contactor coil 50. Under normal operating conditions, the compressor contactor coil 50 has the manufacturer's rated voltage across it, and maintains the compressor contacts 68 in a closed position enabling the air conditioner compressor 66 to remain on. When the voltage across the compressor contactor coil 50 drops to a low value or to zero, the compressor contacts 68 open disrupting power to the air conditioner compressor 66.

The sensor switches 52, 54 and 56 are designed to respond to predefined fault conditions within the air conditioner 58. These conditions typically include but are not limited to high pressure, low pressure and frozen refrigerant conditions as mentioned previously. The sensor switches 52, 54 and 56 remain closed under normal operating conditions and open upon the detection of at least one of the predefined faults. The full-wave rectifier bridge 60 has input terminals 72 and 74, a positive output terminal 76 and a negative output terminal 78. It is connected in series with the compressor contactor coil 50, the power supply 70 and the sensing switches 52, 54 and 56. The positive output terminal 76 is connected to the input terminals 72 and 74 through diodes 80 and 82 respectively. The negative output terminal 78 is connected to input terminals 72 and 74 through diodes 84 and 86, respectively. The full-wave rectifier bridge 60 directs the positive half cycle from the AC power supply 70 through the switching means 62 and inverts the negative half cycle into a positive half cycle before directing it through the same switching means 62.

A thyristor such as a silicon controlled rectifier (SCR) is used as the switching means 62 in a preferred embodiment of the invention. The SCR 62 is positioned across the diode bridge 60, having its anode connected to the positive terminal 76 and its cathode connected to the negative terminal 78. Under normal operating conditions, the SCR 62 is conducting and enables the flow of sufficient current through the compressor contactor coil 50 to maintain the compressor contacts 68 in a closed state. The SCR 62 functions by turning on at the beginning of each half cycle and turning off briefly when the voltage across the SCR 62 drops to zero at the end of each half cycle. This shut off time is negligible so that the operation of the compressor contactor coil 50 is not affected. Should one of the predefined fault conditions occur, the SCR 62 becomes non conductive and disrupts the flow of current to the compressor contactor coil 50 shutting off the air conditioner compressor 66. A resistor 88 and a capacitor 90 are connected in series across the anode and cathode of the SCR 62 to prevent false triggering of the SCR 62 when it is in its non conductive state.

The solid state device 64 is positioned in control relation to the SCR 62. A transistor such as a MOSFET is used in the preferred embodiment of the invention. The MOSFET 64 drain terminal is connected to the gate of the SCR 62. A capacitor 92 is placed between the MOSFET 64 gate and its source. During normal operations, a circuit node 94, the negative output terminal 78 and either side of a bleed resistor 96 are at the same potential so that the capacitor 92 does not charge and the MOSFET 64 remains off. Under predefined fault conditions, capacitor 92 charges and maintains the MOSFET 64 gate voltage at a threshold level so that the MOSFET 64 turns on and remains on. When the MOSFET 64 is on, the SCR 62 gate voltage is pulled low. When the SCR 62 turns off during the next half cycle, it is unable to turn on again as its gate voltage is too low to trigger the SCR 62 into conduction. As a result the SCR 62 remains non conductive.

A voltage limiting device 98 is connected across the source and gate of the MOSFET 64 to protect it from overvoltage conditions. A zener diode is used as the voltage limiting device 90 in a preferred embodiment of the invention. A resistor 100 is conventionally placed to act as a current limiting device to protect the zener diode 98. A diode 102 directs the current from the power supply 70 to power the MOSFET 64 when one of the sensing switches 52, 54 or 56 opens in response to a predefined fault condition within the air conditioner 58.

In the preferred embodiment of the invention, under normal operating conditions, the current flows from the power supply 70 through the closed sensor switches 52, 54 and 56 to the input terminals 72 and 74 of the full-wave rectifier bridge 60. The current flow continues from the positive bridge terminal 76 to the negative bridge terminal 78 through the conductive SCR 62. The current then flows through compressor contactor coil 50. The compressor contactor coil 50 receives sufficient current to maintain the compressor contacts 68 in a closed position and the air conditioner compressor 66 remains on.

When one of the predefined fault conditions such as high pressure, low pressure or frozen refrigerant occurs within the air conditioner 58, the associated sensing switch 52, 54 or 56 opens. This creates a break in the normal current path and causes the current to flow through the diode 102 and begin to charge the capacitor 92. The capacitor 92 regulates the MOSFET 64 gate voltage so that the MOSFET 64 turns on and remains on. When the MOSFET 64 turns on, it pulls down and maintains the SCR 62 gate voltage in a low state and renders the SCR 62 non conductive disrupting the flow of current to the compressor contactor coil 50. This causes the compressor contacts 68 to open and the air conditioner compressor 66 to shut down.

Since the capacitor 92 maintains the MOSFET 64 gate voltage at a threshold level, the MOSFET 64 remains on and ensures that the SCR 62 remains non conductive. The compressor contactor coil 50 continues to receive insufficient current to close the compressor contacts 68. Since the compressor contacts 68 remain open, the air conditioner compressor 66 remains off or "locked out" until the fault condition that initially triggered the protection circuit is remedied.

At this time, the circuit may be manually reset by first opening and then reclosing a power supply switch 104. Opening the switch 104 causes the charge on the capacitor 92 to bleed through the resistor 96. Since the capacitor 92 is discharged, the MOSFET 64 turns off and remains off so that when the switch 104 is reclosed, the MOSFET 64 can no longer disable the SCR 62.

It will be appreciated that the use of a semiconductor switching mechanism characterized by defined on and off states in the protection circuit, provides a means for disconnecting the power to the air conditioner compressor under fault conditions and for ensuring that the power connection to the compressor remains disabled until the system is reset manually. In addition, not only is the protection system less susceptible to power fluctuations, but it also eliminates the need for the use of impedance relays which require careful impedance balancing.

It will also be appreciated that the solid state protection circuit can be assembled on a compact printed circuit board and easily integrated into the contactor assembly to form a single unit. This eliminates time, labor and expenses associated with mounting and wiring an additional relay and reduces the possibility of potential field problems with the protection circuitry.

We claim:

1. A protection circuit for a compressor in a vapor compression air conditioner energized from power supply by the closing of contacts operated by a contactor coil comprising:
    a contactor coil;
    at least one sensing switch for sensing a predetermined condition of the air conditioner and for changing its state in response thereto said sensing switch being in series with said coil and adapted to be in series with the power supply;
    a diode bridge connected between one side of said sensing switch and said coil;
    a first semiconductor connected across said diode bridge and operable when in a conductive state to allow sufficient current to flow through said coil to close contacts associated therewith; and
    a second semiconductor connected in control relation to said first semiconductor and adapted to be connected across said power supply for placing and holding said first semiconductor in a non conductive state when said sensing switch changes state in response to the sensing of said predetermined condition.

2. A protection circuit according to claim 1 wherein said first semiconductor comprises a thyristor.

3. A protection circuit according to claim 2 wherein said thyristor comprises a SCR.

4. A protection circuit according to claim 2 wherein a second capacitor and first resistor are connected across the anode and cathode of said thyristor to prevent false triggering when said thyristor is in a non conducting state.

5. A protection circuit according to claim 1 wherein said second semiconductor comprises a transistor.

6. A protection circuit according to claim 5 wherein said transistor comprises a FET.

7. A protection circuit according to claim 6 wherein said FET comprises a MOSFET.

8. A protection circuit according to claim 7 including a voltage limiting resistance to protect said MOSFET connected across the source and gate of said MOSFET.

9. A protection circuit according to claim 8 wherein said voltage limiting resistance comprise a zener diode.

10. A protection circuit according to claim 7 including a first capacitor connected across the source and gate of said MOSFET, said first capacitor being operative to hold said MOSFET in a conductive state.

11. A protection circuit according to claim 4 including a power rectifier to direct current towards said second semiconductor when said sensing switch changes state in response to the sensing of predetermined condition.

12. A protection circuit according to claim 11 wherein said power rectifier comprises a diode.

13. A protection circuit for a compressor in a vapor compression air conditioner energized from power supply by the closing of contacts operated by a contactor coil comprising:
    a contactor coil;
    at least one sensing switch for sensing a predetermined condition of the air conditioner and for changing its state in response thereto said sensing switch being in series with said coil and adapted to be in series with the power supply;
    a diode bridge connected between one side of said sensing switch and said coil;
    a first switch connected across the power supply and operable when in a first state to allow sufficient current to flow through said coil to close contacts associated therewith and in a second state to prevent sufficient current from flowing thru said coil to close contacts associated therewith; and
    a second switch connected in control relation to said first switch and adapted to be connected across the power supply for placing and holding said first switch in the second state when said sensing switch changes state in response to the sensing of said predetermined condition.

14. A protection circuit for a compressor in a vapor compression air conditioner energized from power supply by the closing of contacts operated by a contactor coil comprising:
    a contactor coil;
    at least one sensing switch for sensing a predetermined condition of the air conditioner and for changing its state in response thereto said sensing switch being in series with said coil and adapted to be in series with the power supply;
    a diode bridge connected between one side of said sensing switch and said coil;
    a first switch connected across said diode bridge and operable when in a conductive state to allow sufficient current to flow through said coil to close contacts associated therewith; and
    a second switch connected in control relation to said first switch and adapted to be connected across said power supply for placing and holding said first switch in a non conductive state when said sensing switch changes state in response to the sensing of said predetermined condition.

15. A protection circuit according to claim 14 wherein said first switch comprises a first solid state device.

16. A protection circuit according to claim 14 wherein said second switch comprises a second solid state device.

* * * * *